(12) United States Patent
Ishibashi et al.

(10) Patent No.: US 8,828,483 B2
(45) Date of Patent: Sep. 9, 2014

(54) MANUFACTURING METHOD FOR MAGNETIC RECORDING MEDIUM, MAGNETIC RECORDING/REPRODUCING DEVICE

(75) Inventors: Shinichi Ishibashi, Tokyo (JP); Manabu Ueda, Nabari (JP); Akira Sakawaki, Ichihara (JP)

(73) Assignee: Showa Denko K.K., Tokyo (JP)

( * ) Notice: Subject to any disclaimer, the term of this patent is extended or adjusted under 35 U.S.C. 154(b) by 443 days.

(21) Appl. No.: 13/382,309

(22) PCT Filed: Jul. 1, 2010

(86) PCT No.: PCT/JP2010/061246
§ 371 (c)(1),
(2), (4) Date: Jan. 5, 2012

(87) PCT Pub. No.: WO2011/004761
PCT Pub. Date: Jan. 13, 2011

(65) Prior Publication Data
US 2012/0113549 A1   May 10, 2012

(30) Foreign Application Priority Data

Jul. 10, 2009 (JP) ................................. 2009-164003

(51) Int. Cl.
*B05D 3/00* (2006.01)
*G11B 5/855* (2006.01)

(52) U.S. Cl.
CPC ...................................... *G11B 5/855* (2013.01)
USPC ............................ 427/129; 427/130; 360/328

(58) Field of Classification Search
CPC ................................. G11B 5/743; G11B 5/33
USPC .......... 427/129, 130; 216/22, 75, 76; 360/328
See application file for complete search history.

(56) References Cited

U.S. PATENT DOCUMENTS

| | | | |
|---|---|---|---|
| 2005/0196650 A1* | 9/2005 | Suwa et al. | 428/848 |
| 2006/0124585 A1 | 6/2006 | Suwa et al. | |
| 2006/0257694 A1* | 11/2006 | Hieda et al. | 428/826 |
| 2009/0168244 A1* | 7/2009 | Okawa et al. | 360/135 |
| 2009/0242508 A1 | 10/2009 | Hattori et al. | |

FOREIGN PATENT DOCUMENTS

| | | |
|---|---|---|
| CN | 1538393 A | 10/2004 |
| CN | 1725306 A | 1/2006 |
| CN | 1885411 A | 12/2006 |
| JP | 2004-164692 A | 6/2004 |
| JP | 2006-196143 A | 7/2006 |
| JP | 2009-230823 A | 10/2009 |

OTHER PUBLICATIONS

Office Action with a mailing date of Jan. 24, 2014 for corresponding Chinese Patent Application No. 201080030040.0.

* cited by examiner

*Primary Examiner* — Michael Cleveland
*Assistant Examiner* — Tabassom Tadayyon Eslami
(74) *Attorney, Agent, or Firm* — Sughrue Mion, PLLC

(57) ABSTRACT

Disclosed is a method of manufacturing a magnetic recording medium having a clear magnetic recording pattern through a simple process. The method includes: forming a magnetic layer on the non-magnetic substrate; forming a mask layer which covers a surface of the magnetic layer; forming a resist layer on the mask layer; patterning the resist layer using a stamp; patterning the mask layer using the resist layer, forming a recess by partially removing a portion of the magnetic layer not covered by the mask layer; forming a non-magnetic layer which covers a surface where a recess is formed; flattening a surface of the non-magnetic layer until the mask layer is exposed; removing an exposed mask layer; removing a protruding portion of the non-magnetic layer; and forming a protective layer which covers a surface where the protruding portion was removed.

4 Claims, 6 Drawing Sheets

PROCESS G

PROCESS H

PROCESS I

PROCESS J

PROCESS K

PROCESS L

PROCESS M

PROCESS N

PROCESS O

PROCESS P

PROCESS G'

PROCESS H'

PROCESS I'

PROCESS J'

PROCESS K'

MANUFACTURING METHOD FOR MAGNETIC RECORDING MEDIUM, MAGNETIC RECORDING/REPRODUCING DEVICE

TECHNICAL FIELD

The present invention relates to a method of manufacturing a magnetic recording medium, and a magnetic recording/reproducing device used in a hard disk drive (HDD) and the like.

Priority is claimed on Japanese Patent Application No. 2009-164003, filed Jul. 10, 2009, the contents of which are incorporated herein by reference.

BACKGROUND ART

In recent years, magnetic recording devices such as a magnetic disc device, a flexible disc device, and a magnetic tape device have been used over a remarkably wide and increasing range of applications, and have grown in importance. Along with this, attempts continue to be made to greatly increase the recording density of the magnetic recording medium for use in such recording devices. In particular, an areal density has been intensively increased since the introduction of an MR head and a PRML technology. Moreover, a GMR head and a TMR head or the like have also been introduced recently, and the areal density keeps increasing at a rate as high as about 100% per year.

There is a demand for such a magnetic recording medium to have a higher recording density in the future. It is therefore necessary to increase a coercive force, a signal-to-noise ratio (SNR), and a resolution of the magnetic layer. Recently, efforts to increase the areal density by increasing both a track density and a linear recording density have been made.

The up-to-date magnetic recording device has a track density as high as 110 kTPI. As the track density increases, however, magnetic recording information between adjacent tracks begins interfering with each other. As a result, a magnetizing transition area of the border area thereof becomes a noise source, which may easily adversely affect the SNR. The decrease of the SNR may directly lead to a decrease in a bit error rate and hinder improvement in the recording density.

In order to increase the areal density, it is necessary to make the size of each recording bit on the magnetic recording medium finer and to ensure that a saturation magnetization and a magnetic film thickness be as large as possible for each recording bit. However, as the recording bits become finer, the magnetization minimum volume per single bit becomes smaller, and the recorded data may disappear due to magnetization reversal caused by heat fluctuation.

Since the adjacent tracks come close to each other as the track density increases, a very highly precise track servo technique is necessary for the magnetic recording device. In addition, in the generally used method, recording is performed in a wide range, and reproducing is narrowly performed in order to eliminate possible influence from adjacent tracks. However, although the influence between the tracks can be suppressed to the minimum by this method, it is difficult to obtain a sufficient reproduction output, and as a result it is difficult to ensure a sufficient SNR.

As one way to address such a heat fluctuation problem, to achieve a sufficient output, and to ensure the SNR, there has been an attempt to increase the track density by forming unevenness along the track on the surface of the recording medium and physically separating recording tracks. Such a technique is usually called a discrete track method, and a magnetic recording medium manufactured thereby is called a discrete track medium. An attempt has also been made to produce a so-called "patterned medium" by further dividing data areas in the same track.

As an exemplary discrete track medium, a magnetic recording medium is known, in which the magnetic recording medium is formed on the non-magnetic substrate which has an uneven pattern on the surface, and a physically separated magnetic recording track and a servo signal pattern are formed (for example, refer to Japanese Unexamined Patent Application, No. 2004-164692).

In the disclosed magnetic recording medium, a ferromagnetic layer is formed through a soft magnetic layer on the substrate surface with a plurality of projections and recesses thereon, and a protective film is formed thereon. In this magnetic recording medium, a magnetic recording region physically separated from the surroundings is formed in a projection area.

According to the disclosed magnetic recording medium, generation of a magnetic wall on the soft magnetic layer can be suppressed, the influence of the heat fluctuation can thus be made difficult, and no interference occurs between adjacent signals. As a result, it is possible to form a high-density magnetic recording medium with little noise.

PATENT DOCUMENT

Japanese Unexamined Patent Application Publication No. 2004-164692

DISCLOSURE OF INVENTION

As a method of patterning the magnetic layer when manufacturing a patterned medium or the so-called discrete track medium having a magnetically separated magnetic recording pattern described above, a method of physically processing the magnetic layer has been used in the related art, in which a patterned mask layer is provided on the surface of the magnetic layer, and the magnetic layer is physically fabricated by ion milling or the like using this mask layer.

However, in a case where such a method of the related art is used, the magnetic layer is processed by ion milling and the mask layer itself is etched by ions. As a result, the edge roll-off of the mask layer occurs, and this edge roll-off spreads gradually so that the cross-section of the magnetic layer to be processed may have a trapezoidal shape. In this case, a pattern blur of the magnetic recording pattern is generated by the edge roll-off of the magnetic layer. Therefore, it may lead to deterioration of the error rate by reducing the signal from this magnetic recording pattern.

Solution to Problem

The present invention has been proposed to address such problems and provides a method of manufacturing a magnetic recording medium having a clear magnetic recording pattern using a simple process, and a magnetic recording/reproducing device capable of further improving an electromagnetic conversion characteristic using a magnetic recording medium produced by such a manufacturing method.

According to an aspect of the invention, there is provided:

(1) A method of manufacturing a magnetic recording medium having a magnetically separated magnetic recording pattern, including: forming a magnetic layer on at least one surface of a non-magnetic substrate; forming a mask layer which covers the surface of the magnetic layer; forming a resist layer patterned to have a shape corresponding to the magnetic recording pattern on the mask layer; patterning the mask layer to have the shape corresponding to the magnetic recording pattern using the resist layer; forming a recess by partially removing a portion of the magnetic layer not covered by the mask layer; forming a non-magnetic layer which covers the surface where the recess is formed; flattening the surface of the non-magnetic layer until the mask layer is exposed; removing the exposed mask layer; removing a protruding portion of the non-magnetic layer protruding outwardly from an inner side of the recess relative to the surface of the magnetic layer; and forming a protective layer which covers the surface where the protruding portion is removed.

(2) In the method described above, the non-magnetic layer may be formed with a sufficient thickness to bury the recess, and when removing the protruding portion of the non-magnetic layer, the flattening may be performed until the surface of the magnetic layer and the non-magnetic layer buried in the recess are flattened.

(3) In the method described in (1) or (2), in forming the mask layer, the mask layer may be formed by laminating a lower mask layer and an upper mask layer.

(4) In the method described in (3), an alloy film containing any one selected from the group consisting of Cr, Ni, and Ti may be formed as the lower mask layer, and a carbon film may be formed as the upper mask layer.

(5) According to another aspect of the invention, there is provided a magnetic recording/reproducing device including: the magnetic recording medium manufactured by the method described in any one of (1) to (4); a medium drive unit that drives the magnetic recording medium in a recording direction; a magnetic head that performs a recording operation and a reproducing operation for the magnetic recording medium; a head moving device for moving the magnetic head relative to the magnetic recording medium; and recording reproduction signal processing means for performing a signal input to the magnetic head and reproducing an output signal from the magnetic head.

Advantageous Effects of Invention

As described above, according to the present invention, it is possible to manufacture a magnetic recording medium having a clear magnetic recording pattern through a simple process. As a result, it is possible to manufacture a magnetic recording medium having a high recording density with high productivity. In addition, it is possible to further improve the electromagnetic conversion characteristics in the magnetic recording/reproducing device using such a magnetic recording medium.

DESCRIPTION OF EMBODIMENTS

Hereinafter, embodiments of the present invention will be described in detail with reference to the accompanying drawings (focusing on a method of manufacturing the magnetic recording medium).

In the embodiment, as the method of manufacturing the magnetic recording medium according to the present invention, a case of manufacturing a discrete magnetic recording medium will be exemplarily described in detail.

Figure 1:
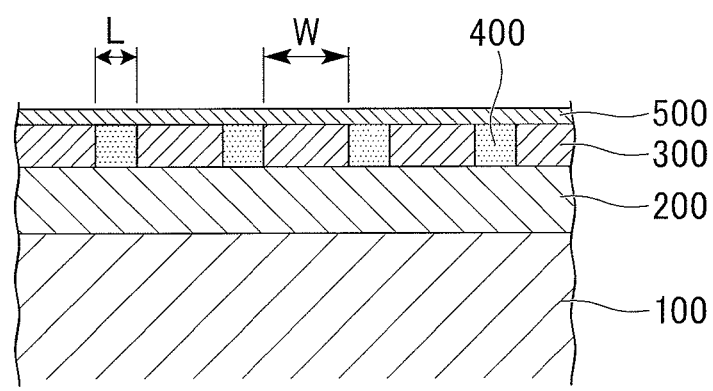
FIG. 1 is a cross-sectional view illustrating an exemplary magnetic recording medium manufactured by applying the present invention.

As illustrated in FIG. 1, for example, in the discrete magnetic recording medium manufactured according to the present invention the following are formed: a soft magnetic layer and an intermediate layer 200 on at least one surface of a non-magnetic substrate 100; a magnetic region 300 where a magnetic recording pattern is formed; a non-magnetic region 400; and a protective layer 500. Additionally, the medium has a structure in which the lubrication film (not shown) is formed on the outermost surface. In addition, the magnetic region 300 forms a recording track region, and the non-magnetic region 400 forms a region for separating the magnetic region 300.

For the discrete magnetic recording medium manufactured according to the present invention, the width W of the magnetic region 300 is preferably set to 200 nm or smaller, and the width L of the non-magnetic region 400 is preferably set to 100 nm or smaller. Therefore, in order to increase the recording density, a track pitch P (=W+L) is preferably set as narrow as possible within a range of 300 nm or smaller.

Although the discrete magnetic recording medium of FIG. 1 is an example in which a portion of the magnetic layer of the non-magnetic region 400 is removed, it is preferable from the viewpoint of a floating characteristic that the magnetic layer of this portion have a recess depth of 2 to 15 nm, and preferably, 5 to 10 nm by removing only the surface layer thereof.

The magnetic recording medium according to the present invention includes a so-called patterned medium in which the magnetic recording patterns are arranged with specific regularity for every single bit, a medium in which the magnetic recording patterns are arranged in a track pattern, a servo signal pattern, and the like. Among them, from the viewpoint of simplicity of manufacturing, it is preferable to apply the present invention to the so-called discrete magnetic recording medium in which the magnetically separated magnetic recording pattern includes the magnetic recording track and the servo signal pattern.

The magnetic recording pattern according to the present invention is not limited to the state where the magnetic layer 300 is separated by the non-magnetic region 400 described above. It is possible to achieve the object of the invention if the magnetic layer is separated as seen from the surface side even when the magnetic recording pattern is not separated from the bottom of the magnetic layer. This is also included in the concept of the magnetically separated recording pattern according to the invention.

Next, a method of manufacturing the magnetic recording medium according to the present invention will be described with reference to the processes A to K of FIGS. 2 and 3.

In order to manufacture a magnetic recording medium having a magnetically separated magnetic recording pattern, the method of manufacturing the magnetic recording medium according to the present invention includes:

a process A of forming a magnetic layer 2 on at least one surface of a non-magnetic substrate 1, a process B of forming a mask layer 3 which covers the surface of the magnetic layer 2, a process C of forming a resist layer 4 on the mask layer 3, a process D of patterning the resist layer 4 to a shape corresponding to the magnetic recording pattern using a stamp 5, a process E of patterning the mask layer 3 to the shape corresponding to the magnetic recording pattern using the resist layer 4, a process F of forming a recess 6 by partially removing a portion of the magnetic layer 2 not covered by the mask layer 3, a process G of forming the non-magnetic layer 7 which covers the surface where the recess 6 was formed, a process H of flattening the surface of the non-magnetic layer 7 until the mask layer 3 is exposed, a process I of removing the exposed mask layer 3, a process J of removing a protruding portion 7a of the non-magnetic layer 7 protruding outwardly from an inner side of the recess 6 relative to a surface of the magnetic layer 2, and a process K of forming a protective layer 8 which covers the surface where the protruding portion 7a is removed.

Specifically, the non-magnetic substrate 1 may be any substrate as long as it is a non-magnetic substrate. Examples thereof include an Al alloy substrate such as an Al—Mg alloy having Al as a main component, and substrates made of typical soda glass, aluminosilicate-based glass, crystallized glass, silicon, titanium, ceramic and various types of resins, and the like. Among them, an Al alloy substrate, a glass substrate such as crystallized glass, or a silicon substrate are preferably used. The average surface roughness (Ra) of these substrates is preferably equal to or smaller than 1 nm, more preferably, equal to or smaller than 0.5 nm, and especially preferably, equal to or smaller than 0.1 nm.

The magnetic layer 2 may be an in-plane magnetic layer for an in-plane magnetic recording medium or a perpendicular magnetic layer for a perpendicular magnetic recording medium. However, the perpendicular magnetic layer is preferably used to achieve a higher recording density. In addition, the magnetic layer 2 is preferably formed of an alloy having Co as a main component.

As a magnetic layer 2 for a perpendicular magnetic recording medium, for example, a lamination structure composed of a soft magnetic layer, an intermediate layer, and a recording magnetic layer can be used. Examples of the soft magnetic layer include an FeCo alloy (such as FeCoB, FeCoSiB, FeCoZr, FeCoZrB, and FeCoZrBCu), FeTa alloy (such as FeTaN and FeTaC) and Co alloy (such as CoTaZr, CoZrNB, and CoB). The intermediate layer may include Ru or the like. The recording magnetic layer may include a 70Co-15Cr-15Pt alloy and 70Co-5Cr-15Pt-10SiO$_2$ alloy. In addition, an orientation controlling film containing Pt, Pd, NiCr, NiFeCr or the like may be deposited between the soft magnetic layer and the intermediate layer.

Meanwhile, as the magnetic layer 2 for an in-plane magnetic recording medium, a lamination structure composed of a non-magnetic CrMo base layer and a ferromagnetic CoCrPtTa magnetic layer may be used.

The thickness of the magnetic layer 2 may be set to 3 nm or greater and 20 nm or smaller, and preferably, 5 nm or greater and 15 nm or smaller such that a sufficient head input and output performance can be obtained depending on the type and the lamination structure of the employed magnetic alloy. It is necessary to set the thickness of the magnetic layer 2 to be optimal because a certain level of thickness is necessary to obtain a certain level of output during reproduction, and various parameters representing the recording reproduction characteristics are typically deteriorated as the output increases. The magnetic layer 2 is usually formed as a thin film by a sputtering method.

For example, as a mask layer 3, a carbon film is preferably used. Although the carbon film may be formed by a sputtering method or a CVD method, a more precise carbon film can be formed using the CVD method. In addition, since the carbon film is easily formed through dry etching (reactive ion etching or reactive ion milling) using an oxygen gas, it is possible to reduce remnants and contamination on the surface of the magnetic recording medium.

The thickness of the mask layer 3 may be set to, preferably, 5 to 40 nm, and more preferably, 10 to 30 nm. If the thickness of the mask layer 3 is thinner than 5 nm, the edge of the mask layer 3 is rolled off, and the formation characteristics of the magnetic recording pattern are deteriorated. In addition, ions transmitted through the resist layer 4 and the mask layer 3 intrude into the magnetic layer 2, which adversely affects the magnetic property of the magnetic layer 2. On the other hand, if the mask layer 3 is thicker than 40 nm, etching time increases, and productivity is degraded. In addition, the residue generated when the mask layer 3 is etched is likely to remain on the surface of the magnetic layer 2.

In the method of manufacturing the magnetic recording medium according to the present invention, the resist layer 4 is formed on the mask layer 3, and a negative pattern (recess) 9 of the magnetic recording pattern is formed on the resist layer 4. A typical photolithography technique may be used to form the negative pattern 9 on the resist layer 4. However, a method of transferring a negative pattern of the magnetic recording pattern to the resist layer 4 using the stamp 5 is preferably used from the viewpoint of work efficiency.

It is preferable that the resist layer 4 be made of a radiation-curable material, and that radiation be irradiated onto the resist layer 4 when or after the negative pattern 9 to the resist layer 4 is transferred to the resist layer 4 using the stamp 5. As a result, the shape of the stamp 5 can be transferred with high precision to the resist layer 4. For the etching process of the mask layer 3 described later, edge roll-off of the mask layer 3 can be eliminated, and a shielding property of the mask layer 3 against the milling ions can be improved. In addition, the formation characteristic of the magnetic recording pattern by the mask layer 3 can also be improved.

Specifically, in the process of transferring a negative pattern 9 to the resist layer 4 using the stamp 5, the stamp 5 is pressed against the resist layer 4 in a state in which the mobility of the resist layer 4 is high. With the stamp 5 being pressed, the resist layer 4 is cured when irradiated with radiation. The stamp 5 is then removed from the resist layer 4. In this manner, the shape of the stamp 5 can be transferred highly precisely to the resist layer 4.

A method of irradiating the radiation onto the resist layer 4 while the stamp 5 is pressed against the resist layer 4 may include a method of irradiating the radiation from the side opposite to the stamp 5, that is, the non-magnetic substrate 1 side, a method of irradiating the radiation from the stamp 5 side by selecting a material capable of transmitting the radiation as a material of the stamp 5, a method of irradiating the radiation from the side face of the stamp 5, and a method of irradiating the radiation by heat conduction from the stamp 5 or the non-magnetic substrate 1, using highly conductive radiation against a solid material such as heat rays. Among them, in particular, it is preferable that novolac resin, acrylic acid esters, and ultraviolet curing resin such as alicyclic epoxies be used as the resist material, and glass or resin which is highly transmissive with respect to ultraviolet rays be used as a stamp material. Examples of the radiation used herein include a wide range of electromagnetic waves, such as heat rays, visible light, ultraviolet rays, X-rays, and gamma rays. Examples of the radiation-curable material include heat-curable resin for the heat rays and ultraviolet-curable resin for the ultraviolet rays.

Particularly, the $SiO_2$-based resist is preferably used in the resist layer 4. The $SiO_2$-based resist is highly resistant to dry etching using an oxygen gas. It is possible to reduce an image blur when a negative pattern of the magnetic recording pattern is formed using the ion milling on the mask layer 3. In other words, since the mask layer 3 can be easily fabricated by dry etching using the oxygen gas, and the $SiO_2$-based resist is highly resistant to dry etching using the oxygen gas, it is possible to fabricate the mask layer 3 in a vertically steep shape by dry etching and forming a magnetic recording pattern with a sharp shape.

After the negative pattern (recess) 9 of the magnetic recording pattern is formed on the resist layer 4, the thickness of the recess 9 on the resist layer 4 is preferably within a range of 0 to 20 nm. As a result, in the process of etching the mask layer 3 and the magnetic layer 2 described below, edge roll-off of the mask layer 3 can be eliminated, and a shielding property of the mask layer 3 against the milling ions can be improved. In addition, the formation characteristic of the magnetic recording pattern using the mask layer 3 can also be improved.

If the resist remains inside the recess 10 formed in the mask layer 3 after patterning the mask layer 3 in the shape corresponding to the magnetic recording pattern using the resist layer 4, the remaining resist is removed. The dry etching such as reactive ion etching or ion milling may be used for the patterning of the mask layer 3 and removal of the resist.

For partially removing a portion of the magnetic layer 2 not covered by the mask layer 3, for example, oxygen gas is introduced to the Inductive Coupled Plasma (ICP) device, and the portion of the mask layer 3 not covered by the resist layer 4 is removed through the reactive ion etching, and subsequently, ion milling is performed for the portion of the magnetic layer 2 not covered by the mask layer 3. As a result, it is possible to form the recess 6 on the magnetic layer 2.

According to the present invention, by employing such a method, it is possible to form the vertical edge portion of the remaining magnetic layer 2. This is because the mask layer 3 on the magnetic layer 2 has a steep vertical shape, and thus, the underlying magnetic layer 2 also has the same shape. As a result, it is possible to form the magnetic layer 2 (magnetic recording pattern) with a superior fringe characteristic.

According to the present invention, for example, it is preferable to provide a process of reforming the magnetic property, that is, eliminating magnetization or reducing the magnetization amount in the portion of the magnetic layer 2, where the recess 6 is formed, by exposing the portion of the magnetic layer 2, where the recess 6 is formed, to an oxygen atmosphere using the ICP device. As a result, it is possible to further improve the fringe characteristic of the magnetic recording medium.

According to the present invention, it is preferable to use an oxygen gas to remove the portion of mask layer 3 not covered by the resist layer 4 through reactive ion etching using the ICP device described above. However, the subsequent dry etching for the magnetic layer 2 may be performed by introducing an inert gas such as an Ar or $N_2$ gas, for example, using a reactive ion-etching device such as ICP or RIE. In addition, the ion milling of the magnetic layer 2 described above may be performed, for example, using an inert gas such as an Ar or $N_2$ gas. That is, the milling ions of the mask layer 3 and the milling ions of the magnetic layer 2 may be optimally changed to, for example, the ICP using the oxygen gas for the mask layer 3 and the ion sealing using the Ar or $N_2$ gas for the magnetic layer 2.

For example, a Cr or Cr alloy such as a CrTi, CrNi, Ti or Ti alloy such as TiB/TiAl, TiAlW, and an Al or Al alloy such as AlSi may be used as the non-magnetic layer 7 which covers the surface where the recess 6 is formed.

According to the present invention, the non-magnetic layer 7 for magnetically separating a magnetic recording track, a servo signal pattern part, or a magnetic recording track is formed by burying a non-magnetic material in the recess 6 of the magnetic layer 2 fabricated by the ion milling. As a result, it is possible to reduce a coercive force and a residual magnetization in the areas between magnetic tracks to the limit, eliminate a write bleeding during the magnetic recording, and provide a magnetic recording medium with a high areal density.

After the non-magnetic layer 7 is formed, a polishing process such as chemical mechanical polishing (CMP) is performed on the non-magnetic layer 4. As a result, the mask layer 3 is exposed from a gap between the flattened non-magnetic layers 4. As a method of flattening the non-magnetic layer 7 until the mask layer 3 is exposed, dry etching such as a reactive ion etching and an ion milling may be used in addition to such a polishing process.

In order to remove the mask layer 3, it is preferable to use dry etching such as reactive ion etching or ion milling. In particular, the carbon film used for forming the mask layer 3 can be easily removed by oxygen plasma.

After the mask layer 3 is removed, a protruding portion (called a burr) 7a is formed on the non-magnetic layer 7 which protrudes outwardly from an inner side of the recess relative to the surface of the magnetic layer 2. Reactive ion beam etching, dry etching such as reactive ion etching, or plasma etching may be used along with the CMP to remove the burr 7a. In particular, in order to efficiently remove only the burr 7a, for example, it is preferable to use a technique of reducing the etching rate for the inner side of the recess where the ion beam is incident from an oblique direction by oblique ion beam etching or a technique of increasing the etching rate in the surface portion of the nonmagnetic layer 7 and decreasing the etching rate of the recess 6 by carrying the plasma close to the nonmagnetic substrate 1 in the plasma etching.

On the other hand, since the edge part of the magnetic layer 2 is protected by the non-magnetic layer 7 which covers this part (the inner surface of recess 6), it is possible to maintain a vertically steep sharp shape (rectangularity) even after removing the burr 7a.

After the protruding portion 7a of the non-magnetic layer 7 is removed, a protective layer 8 which covers the entire surface is formed. The protective layer 8 may include a carbonaceous layer such as carbon (C), hydrogenated carbon (HXC), carbon-nitrogen (CN), amorphous carbon, and silicon carbide (SiC), or commonly used protective layer materials such as $SiO_2$, $Zr_2O_3$, and TiN. The protective layer 8 may consist of two or more layers.

The thickness of the protective layer 8 is necessarily set to be less than 10 nm. A distance between the magnetic head and the magnetic layer 2 increases if the thickness of the protective layer 8 exceeds 10 nm. Thus, a sufficient strength of the input and output signal can not be obtained. Typically, a protective film layer is formed by a CVD method or a sputtering method.

It is preferable to form a lubrication film on the protective layer 8. A fluorine-based lubricant, a hydrocarbon-based lubricant, a mixture of them, and the like may be used as a lubricant for the lubrication film. Typically, the lubrication film is formed with a thickness of 1 to 4 nm.

As mentioned above, in the method of manufacturing the magnetic recording medium according to the present invention, the process G is performed after the process F. In other words, after the recess 6 is formed on the magnetic layer 2 by using the mask layer 3 patterned in the shape corresponding to the magnetic recording pattern, the non-magnetic layer 7 which covers the surface where the recess 6 is formed.

In this case, it is possible to prevent edge roll-off in the magnetic layer 2 in advance until the protective layer 8 is formed. That is, through the process H for flattening the surface of the nonmagnetic layer 7 until the mask layer 3 is exposed after the process G, the process I of removing the exposed mask layer 3, and the process J of removing the burr 7a of the non-magnetic layer 7 protruding outwardly from an inner side of the recess relative to the surface of the magnetic layer 2, it is possible to maintain a vertically steep sharp shape (rectangularity) even after the burr 7a is removed since the edge part of the magnetic layer 2 is protected by the non-magnetic layer 7 which covers this part (the inner surface of the recess 6).

Figure 4:
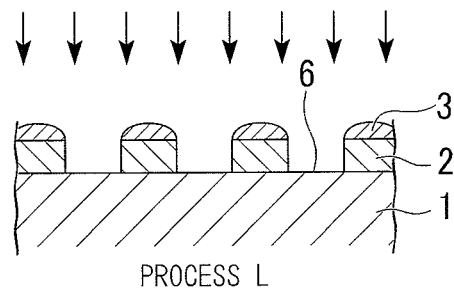
FIG. 4 is a cross-sectional view illustrating processes L to P of manufacturing the magnetic recording medium of the related art as a comparative example.
Figure 4:
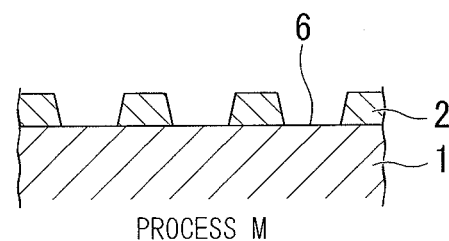
Figure 4:
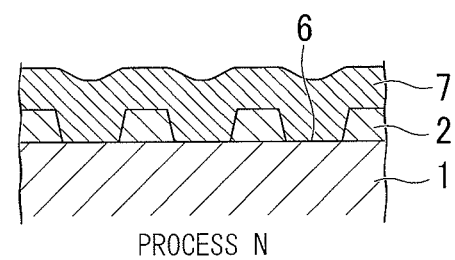
Figure 4:
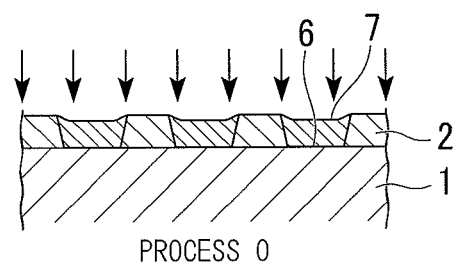
Figure 4:
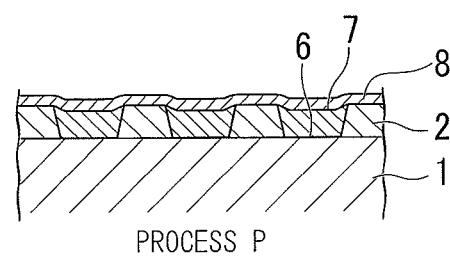

Meanwhile, as illustrated in FIG. 4, if the process L of removing the mask layer 3 through etching is performed after the process F, the edge part of the magnetic layer 2 is also etched. Therefore, roll-off as shown in the process M may occur in the edge part of this magnetic layer 2.

Therefore, in the magnetic recording medium manufactured through the process N of forming the non-magnetic layer 7 which covers the surface where the mask layer 3 is removed after the process M, the process O of flattening the surface of the non-magnetic layer 7 until the magnetic layer 2 is exposed, and the process K of forming the protective layer 8 which covers the flattened surface, the magnetic layer 2 (magnetic recording pattern) ultimately has a trapezoidal cross-section of the magnetic layer 2, and the width of the flat portion of the magnetic layer 2 is reduced, so that the strength of the signal is reduced, and this can lead to degradation of the SN ratio. Furthermore, in the process N, since the thickness necessary to bury the non-magnetic layer 7 in the recess 6 is more than twice that of the process G, the time for the process increases accordingly.

In comparison, since the magnetic recording medium manufactured according to the present invention maintains a vertically steep sharp shape (rectangularity) in the edge part of the magnetic layer 2, and the width of the flat portion of the magnetic layer 2 is also wide, it is possible to obtain high signal strength and ensure a high bit error rate. In addition, since the edge part of the magnetic layer 2 is protected by the non-magnetic layer 7 which covers this part (the inner surface of the recess 6), an anti-corrosion property is also improved.

Figure 5:
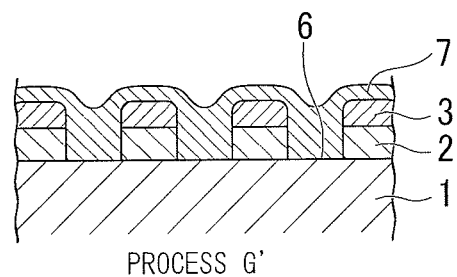
FIG. 5 is a cross-sectional view illustrating other processes G' to K' of manufacturing the magnetic recording medium according to the present invention.
Figure 5:
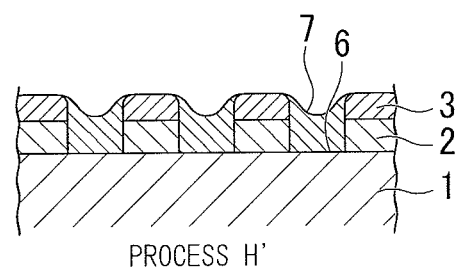
Figure 5:
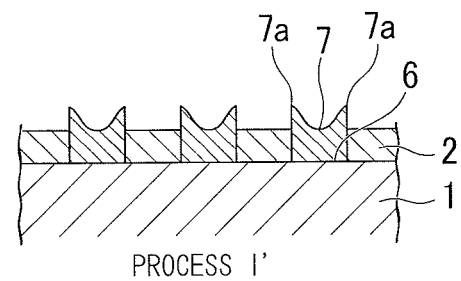
Figure 5:
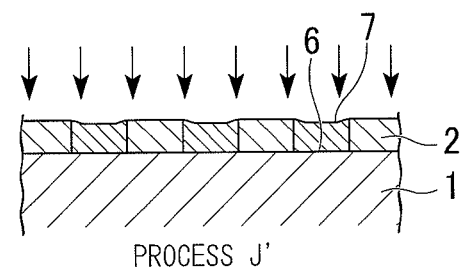
Figure 5:
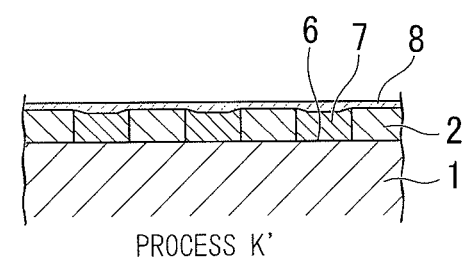

In the method of manufacturing the magnetic recording medium according to the present invention, for example, similar to the processes G' to K' of FIG. 5, the non-magnetic layer 7 may be formed with a sufficient thickness to bury the non-magnetic layer 7 in the recess 6, and the flattening may be performed until the surface of the non-magnetic layer 7 and the magnetic layer 2 form a flat surface when the protruding portion 7a of the non-magnetic layer 7 is removed.

Similarly, in this case, it is possible to maintain rectangularity in the edge part of the magnetic layer 2 and reduce a coercive force and a residual magnetization between magnetic track areas to the limitation by magnetically separating between the magnetic layers 2 (magnetic recording pattern) using the non-magnetic layer 7 buried in the recess 6. Therefore, it is possible to eliminate write bleeding during the magnetic recording and manufacture a magnetic recording medium with a high areal density.

According to the present invention, the mask layer 3 may be formed, for example, by depositing a lower mask layer formed of an alloy film containing any one of Cr, Ni, and Ti such as TiAl, NiW, NiTi and an upper mask layer formed of a carbon film. In this case, since the lower mask layer protects the surface of the magnetic layer 2 when the exposed upper mask layer is removed in the step I, and then, the burr 7a of the non-magnetic layer 7 protruding outwardly from an inner side of the recess 6 relative to the surface of the magnetic layer 2 is removed in the step J, it is possible to more appropriately maintain a vertically steep sharp shape (rectangularity) of the magnetic layer 2 after the burr 7a is removed.

As described above, according to the present invention, since the magnetic recording medium having a clear magnetic recording pattern can be manufactured by a simple process, it is possible to manufacture the magnetic recording medium having a high recording density with high productivity. In addition, in the magnetic recording/reproducing device using such a magnetic recording medium, it is possible to further improve the electromagnetic conversion characteristics.

(Magnetic Recording/Reproducing Device)

Figure 6:
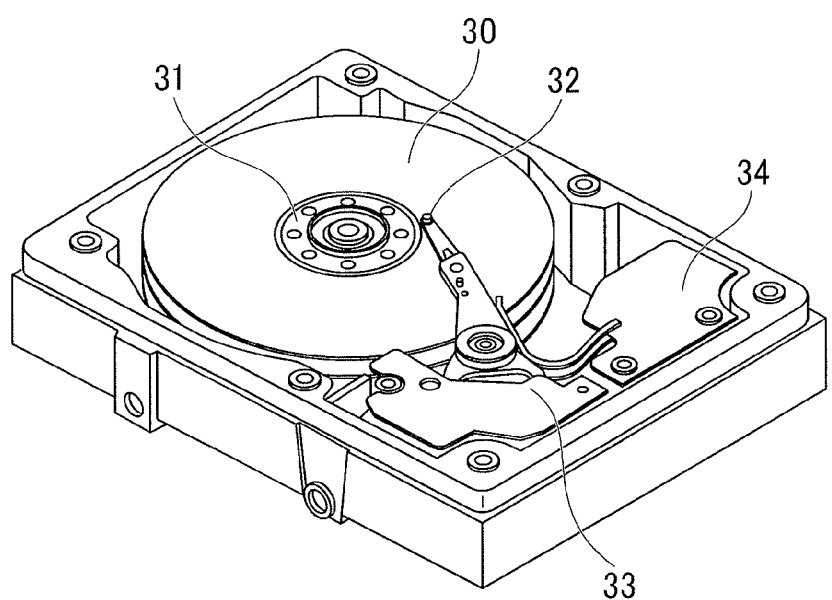
FIG. 6 is a perspective view illustrating an exemplary magnetic recording/reproducing device according to the present invention.

Next, a configuration example of the magnetic recording/reproducing device (HDD) according to the present invention will be described with reference to FIG. 6. The magnetic recording/reproducing device according to the present invention as illustrated in FIG. 3 includes the magnetic recording medium 30 manufactured by applying the present invention, a rotary drive unit 31 (a medium drive unit that drives the magnetic recording medium to the recording direction) that rotationally drives the magnetic recording medium, a magnetic head 32 which performs a recording operation and a reproducing operation for the magnetic recording medium 30, a head drive unit 33 that moves the magnetic head 32 to the radial direction of the magnetic recording medium 32 (a head moving device that moves the magnetic head relative to the magnetic recording medium), and a recording reproduction signal processing system 34 (recording reproduction signal processing means) for inputting a signal to the magnetic head 32 and reproducing the output signal from the magnetic head 32.

In the magnetic recording/reproducing device, it is possible to eliminate the write bleeding during magnetic recording and thus obtain a high areal density by using the discrete track magnetic recording medium 30. That is, it is possible to configure the magnetic recording/reproducing device with a high recording density by using the magnetic recording medium 30 according to the present invention. In addition, it is possible to operate both recording tracks with almost the same width by magnetically discontinuously fabricating the recording track of the magnetic recording media 30 in comparison with the related art in which the reproducing head width is narrower than the recording head width in order to exclude the effect of the magnetization transition area in the track edge part. As a result, it is possible to obtain a sufficient reproduction output and a high SNR.

In addition, it is possible to obtain sufficient signal strength for a high recording density and realize the magnetic recording/reproducing device with a high recording density by configuring the reproducing unit of the magnetic head 32 as a GMR head or a TMR head. In addition, it is possible to improve the throughput to obtain a high device SNR and provide the magnetic recording/reproducing device with high reliability and a large capacity by setting the floating quantity of the magnetic head 32 to a range of 0.005 to 0.020 μm to provide floating at a height lower than the related art. It is possible to further improve the recording density by combining the signal processing circuit using the maximum likelihood decoding method. For example, it is possible to obtain a sufficient SNR even when recording and reproducing is performed with a track density equal to or higher than 100 k tracks per inch, a linear recording density equal to or higher than 1000 k bits per inch, and a recording density equal to or higher than 100G bits per square inch.

EXAMPLES

Hereinafter, the effects of the invention will be described in more detail with reference to examples. It should be noted that the invention is not limited to following examples and may be modified without departing from the spirit and scope of the invention.

Example 1

Figure 2:
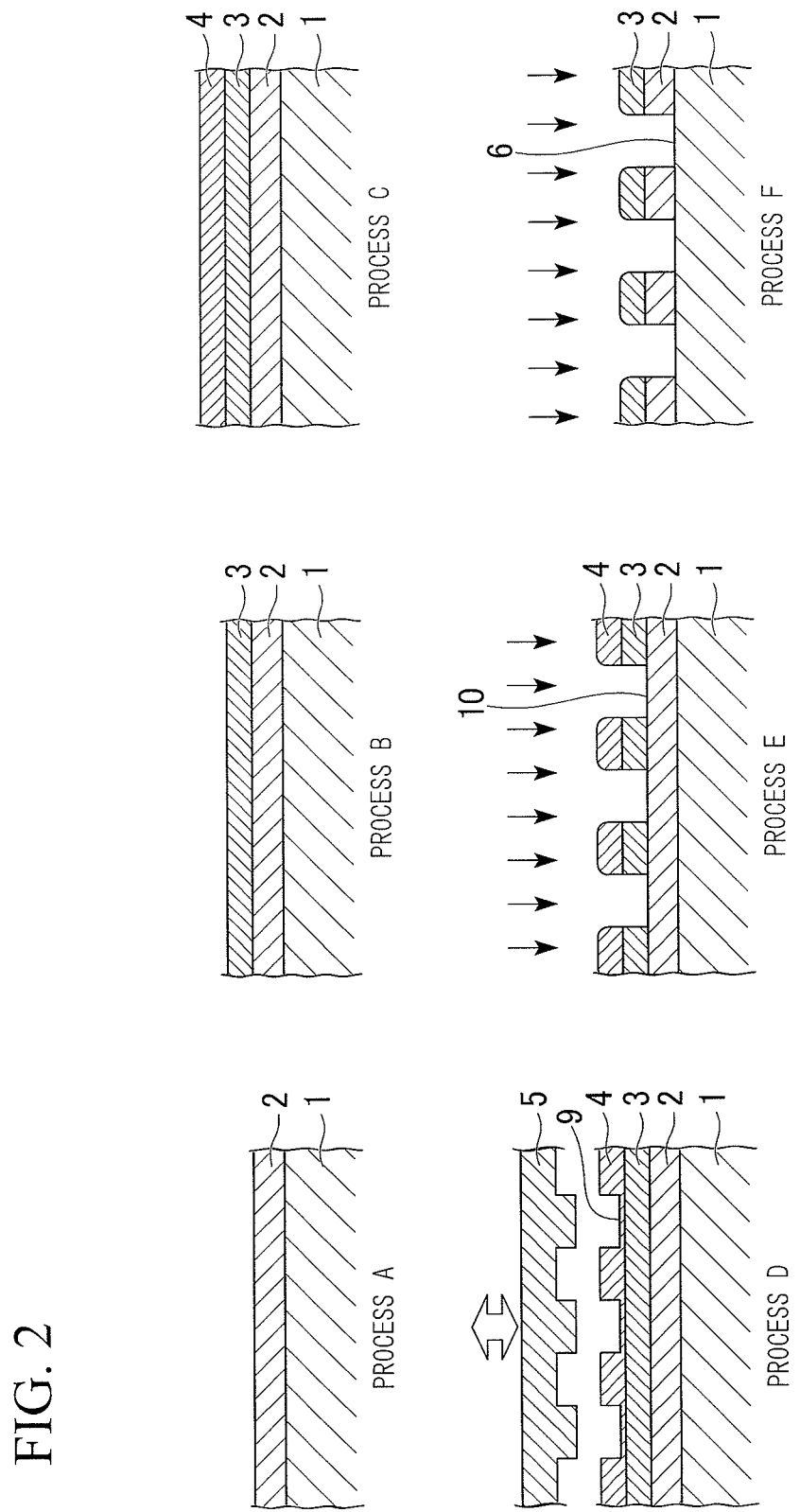
FIG. 2 is a cross-sectional view illustrating processes A to F of manufacturing the magnetic recording medium by applying the present invention.
Figure 3:
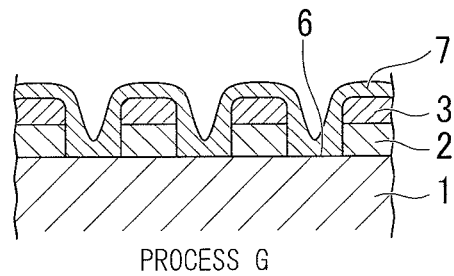
FIG. 3 is a cross-sectional view illustrating processes G to K of manufacturing the magnetic recording medium by applying the present invention.
Figure 3:
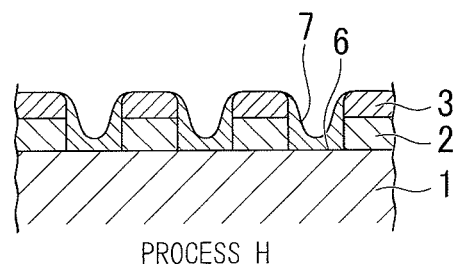
Figure 3:
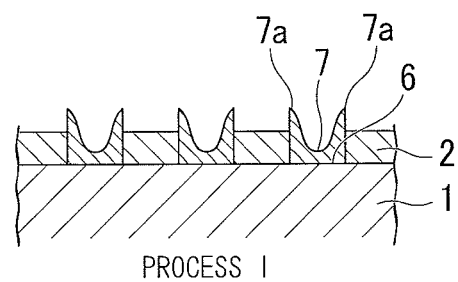
Figure 3:
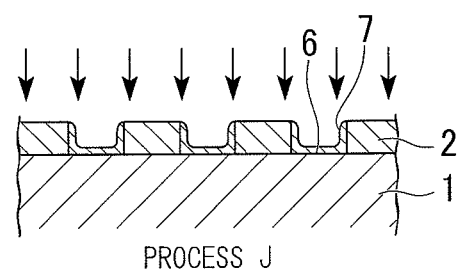
Figure 3:
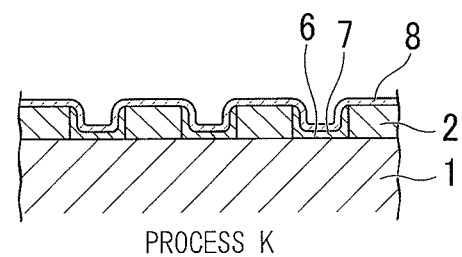

In Example 1, the magnetic recording medium was manufactured according to processes A to K shown in FIGS. 2 and 3. Specifically, a vacuum chamber, in which a glass substrate for the HD is set, was evacuated to a pressure of $1.0 \times 10^{-5}$ Pa or less in advance. The glass substrate used in this case was crystallized glass containing $Li_2Si_2O_5$, $Al_2O_3$—$K_2O$, $Al_2O_3$—$K_2O$, $MgO$—$P_2O_5$, and $Sb_2O_3$—$ZnO$ as a component with an outer diameter of 65 mm, an inner diameter of 20 mm, and an average surface roughness (Ra) of 2 angstroms.

On this glass substrate, using a DC sputtering method, FeCoB was deposited as the soft magnetic layer, Ru was deposited as the intermediate layer, a 70Co-5Cr-15Pt-10$SiO_2$ alloy was deposited as the magnetic recording layer, CrTi was deposited as the metal protective layer, and C was deposited as the mask layer. The thickness of the soft magnetic layer was set to 60 nm, the thickness of the intermediate layer was set to 10 nm, the thickness of the magnetic layer was set to 16 nm, the thickness of the metal protective layer was set to 5 nm, and the thickness of the mask layer was set to 33 nm.

Thereon, a $SiO_2$ resist was coated by a spin coat method with a thickness of 60 nm. Subsequently, using a glass stamp having a negative pattern of the magnetic recording pattern, the resist layer was pressed by the stamp at the pressure of 1 MPa (approximately 10 kgf/cm$^2$). Then, the magnetic recording pattern was transferred onto the resist layer by isolating the stamp from the resist layer. In the magnetic recording pattern transferred onto the resist layer, the convex portion of the resist had a circumferential shape having a width of 62 nm, the recess of the resist had a circumferential shape having a width of 20 nm, and the thickness of the resist layer was 40 nm, and the thickness of the recess of the resist layer was approximately 10 nm. In addition, the recess of the resist layer was angled by almost 90 degrees relative to the substrate surface.

Then, for a recessed portion of the resist layer, the mask layer was removed by dry etching, and the magnetic layer was removed by ion beam etching. As a condition of the dry etching for the mask layer, a flow rate of the $O_2$ gas was 40 sccm, a pressure was 0.3 Pa, a high-frequency plasma power was 300 W, a DC bias was 30 W, and an etching time was 15 seconds. As a condition for the ion beam etching, a flow rate of the Ar gas was 10 sccm, a pressure was 0.1 Pa, an acceleration voltage was 300 V, and an etching time was 30 seconds. The depth of the recess of the magnetic layer was approximately 10 nm.

Subsequently, a CrTi film having a thickness of 10 nm was formed as a non-magnetic layer which covers the surface where the recess is formed, a CMP polishing process was performed for the surface of this non-magnetic layer for 200 to 300 seconds, and then, the flattening was performed until the mask layer 3 was exposed. In addition, the exposed mask layer 3 was removed using the oxygen plasma, and then, a burr of the non-magnetic layer protruding outwardly from an inner side of the recess relative to the surface of the magnetic layer was removed using the plasma etching with an Ar gas.

Then, a 5-nm carbon protection film was formed using the CVD method, and lastly, a 2-nm fluorine lubrication film was coated, so that the manufacture of the magnetic recording medium was completed.

Example 2

In Example 2, the magnetic recording medium was manufactured according to processes A to F and G' to K' shown in FIGS. 2 and 5. Specifically, the magnetic recording medium was manufactured under the same conditions as described in Example 1 except that a CrTi film as the non-magnetic layer had a thickness of 45 nm, and the non-magnetic layer was formed with a sufficient thickness to bury this non-magnetic layer in the recess.

Comparative Example 1

In Comparative Example 1, the magnetic recording medium was manufactured according to processes A to F and L to P shown in FIG. 2 and FIG. 4. Specifically, the magnetic recording medium was manufactured under the same conditions as described in Example 1 except that the mask layer was removed by etching after the recess was formed on the magnetic layer, the non-magnetic layer which covers the surface where the mask layer was removed was formed, the surface of the non-magnetic layer was flattened until the magnetic layer was exposed, and a protective layer which covers the flattened surface was formed.

In addition, for the magnetic recording media of Examples 1 and 2 and Comparative Example 1, the signal strength and the electromagnetic conversion characteristic were evaluated using a spin stand. In this case, as the evaluation head, a perpendicular recording head was used for recording and a TuMR head was used for writing. In addition, a TAA value (µVpp) was measured as the read signal strength, and 2T-squash (dB) obtained when the signal of 750 kFCI was recorded was measured as the electromagnetic conversion characteristic.

As a result, in the magnetic recording medium of Example 1, the signal strength was 7200 µVpp, and the electromagnetic conversion characteristic was 13.3 dB.

In the magnetic recording medium of Example 2, the signal strength was 7140 µVpp, and the electromagnetic conversion characteristic was 13.2 dB.

In the magnetic recording medium of Comparative Example 1, the signal strength was 6621 µVpp, and the electromagnetic conversion characteristic was 12.6 dB.

INDUSTRIAL APPLICABILITY

According to the present invention, the magnetic recording medium for forming the magnetic recording pattern can be used as a magnetic recording medium that is capable of ensuring stability in the head floating, has an excellent separation performance of the magnetic recording pattern, is not influenced by signal interference between adjacent patterns, and has a high recording density characteristic.

REFERENCE SIGNS LIST 100 non-magnetic substrate
200 soft magnetic layer and intermediate layer
300 magnetic region
400 non-magnetic region
500 protective layer
1 non-magnetic substrate
2 magnetic layer
3 mask layer
4 resist layer
5 stamp
6 recess
7 non-magnetic layer
7a burr (protruding portion)
8 protective layer
9 negative pattern (recess)
10 recess
30 magnetic recording medium
31 medium drive unit
32 magnetic head
33 head drive unit
34 recording/reproducing signal system

The invention claimed is:

1. A method of manufacturing a magnetic recording medium having a magnetically separated magnetic recording pattern, the method comprising:

forming a magnetic layer on at least one surface of a non-magnetic substrate;

forming a mask layer which covers the surface of the magnetic layer;

forming a resist layer patterned to have a shape corresponding to the magnetic recording pattern on the mask layer;

patterning the mask layer to have the shape corresponding to the magnetic recording pattern using the resist layer;

forming a recess by partially removing a portion of the magnetic layer not covered by the mask layer;

forming a non-magnetic layer which covers the surface where the recess is formed;

flattening the surface of the non-magnetic layer until the mask layer is exposed; removing the exposed mask layer to form a protruding portion of the non-magnetic layer protruding outwardly from an inner side of the recess relative to the surface of the magnetic layer; and then removing the protruding portion;

forming a protective layer which covers the surface where the protruding portion is removed.

2. The method of manufacturing a magnetic recording medium according to claim 1, wherein the non-magnetic layer is formed with a sufficient thickness to bury the recess, and when removing the protruding portion of the non-magnetic layer, the flattening is performed until the surface of the magnetic layer and the non-magnetic layer buried in the recess are flattened.

3. The method of manufacturing a magnetic recording medium according to claim 1, wherein in forming the mask layer, the mask layer is formed by laminating a lower mask layer and an upper mask layer.

4. The method of manufacturing a magnetic recording medium according to claim 3, wherein an alloy film containing any one selected from the group consisting of Cr, Ni, and Ti is formed as the lower mask layer, and a carbon film is formed as the upper mask layer.

* * * * *